March 6, 1956 N. A. FISHER 2,736,988
MULTI BUBBLE PRODUCING DEVICE
Filed June 23, 1952
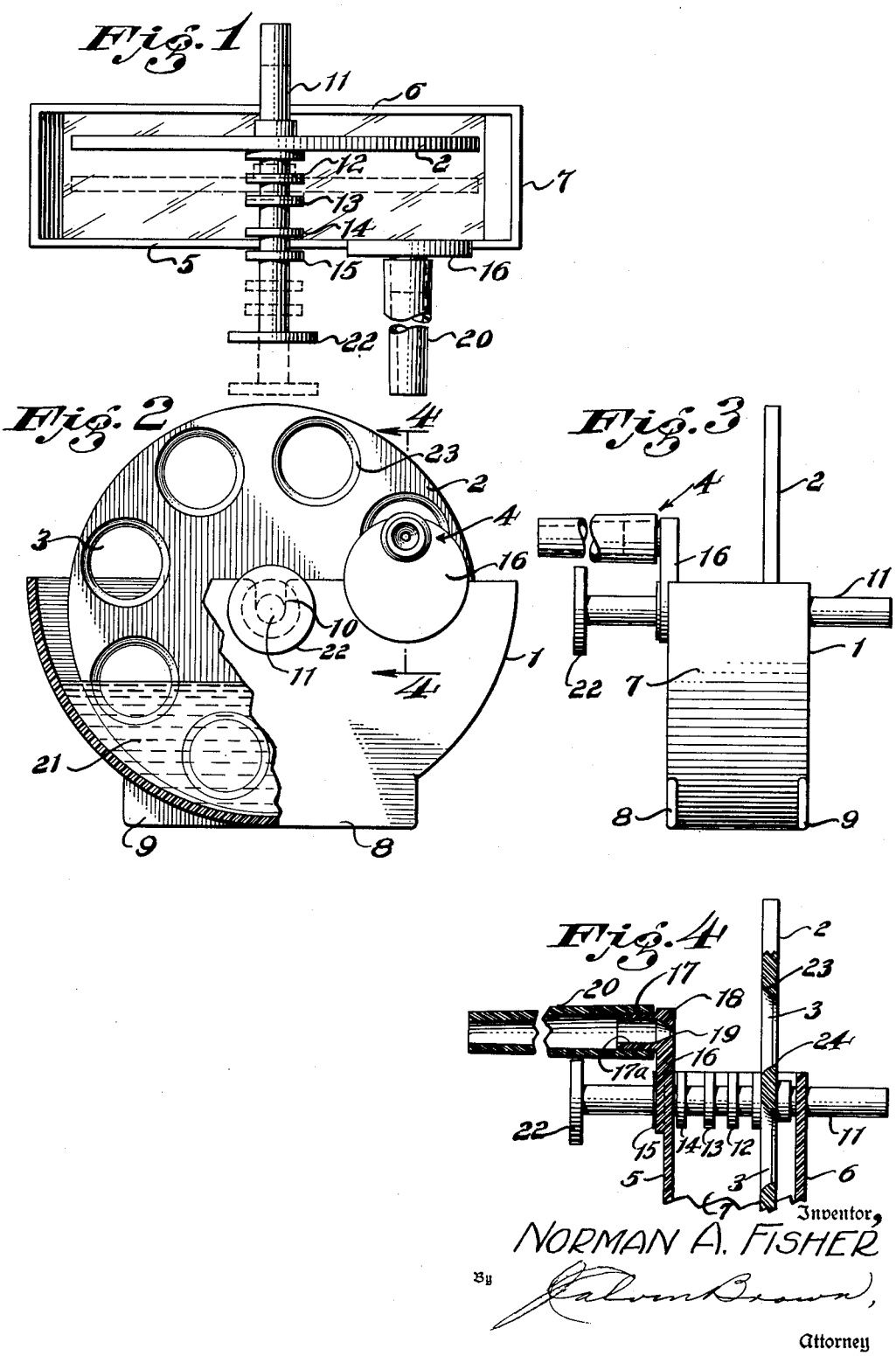
Inventor,
NORMAN A. FISHER
By
Attorney United States Patent Office 2,736,988
Patented Mar. 6, 1956

2,736,988

MULTI BUBBLE PRODUCING DEVICE

Norman A. Fisher, Los Angeles, Calif.

Application June 23, 1952, Serial No. 294,961

6 Claims. (Cl. 46—7)

The present invention constitutes a continuation in part of my application for Multi Bubble Making Machine, filed in the United States Patent Office April 25, 1947, Serial No. 743,913, and since abandoned.

The invention has for an object the provision of a bubble producing device capable of forming multiple bubbles when air is directed through an aperture containing bubble producing liquid.

Specifically, the device contemplates an elongated trough adapted to hold the bubble producing liquid, there being a revoluble disc carried by the trough and projecting thereabove, which disc is formed with a series of spaced apertures adjacent the rim or periphery of the disc. The disc will pick up the bubble producing liquid to surround and bridge the apertures and any excess of said liquid will flow back into the trough, thus conserving the liquid and eliminating froth.

A further object of the invention is the provision of a bubble producing device which is so constructed and arranged as to allow for the production of bubbles of varying sizes.

A further object of the invention is the provision of a bubble producing device wherein a concentrated stream of air may be directed towards an aperture containing bubble producing liquid.

A further object is the provision of a bubble producing device which is saving of liquid.

Other objects of the invention include a bubble producing device which is simple of structure, inexpensive in cost of manufacture and generally superior to devices of like character now known to the inventor.

In the drawing:

Figure 1 is a fragmentary top plan view of the bubble producing device;

Figure 2 is a fragmentary side elevation, partly in section of the device shown in Figure 1;

Figure 3 is a fragmentary end elevation of the device shown in Figure 2; and,

Figure 4 is a fragmentary sectional view on the line 4—4 of Figure 2.

Referring now with particularity to the drawing, the improved device includes a trough 1, a disc 2, adapted to be received within the trough, which disc is provided, adjacent its perimeter, with a series of spaced transverse apertures 3, there being means 4 for directing air through each aperture.

The trough 1 is elongated in form and is provided with parallel side walls 5 and 6, interconnected by a semi-circular end wall 7. A pair of spaced flanges 8 and 9 are secured to the end wall 7 and provide a base for supporting the trough. The upper edges of the side walls are provided with medial transversely aligned depressions as indicated for the side wall 5 by the dotted line 10, the opposite wall 6 being similarly formed.

The disc 2 is centrally mounted on an axle 11, which axle bridges and extends beyond said sides and is received in the medial depressions as shown in Figure 2. The diameter of the trough is greater than the diameter of the disc. However, the periphery of said disc is at all times spaced with relation to the inner surface of the side wall 7. It is also observed from Figure 2 that the disc, in the position shown, has a greater area within the trough than that extending beyond the top edges of the trough. The axle 11 is provided with a plurality of spaced apart circular flanges 12, 13, 14 and 15. The flanges 12 and 13, and 14 and 15 are spaced apart a distance slightly greater than the thickness of the side wall, it being intended that the disc 2 should be movable transversely within the trough and for a purpose as set forth in the statement of the operation.

The side wall 5 is provided with a plate 16, which extends above the top edge of the side wall. Plate 16 supports a tubular stud 17 which projects transversely of the plate above the side wall 5. The tubular stud has a bore 17a of uniform diameter, and a conical bore 18 communicating between bore 17a and a perforation 19. The perforation 19 is directed toward the perforations 3 of the disc and may be brought into axial alignment therewith depending upon the rotative position of the disc. The stud is adapted to carry a detachable elongated blowing tube 20, the bore of which tube may taper or be uniform in diameter. The tubular stud 17, the tube 20 and the conical bore 18, which is a jet, form together a blowing element of which the detachable tube 20 is the initial passage, the interior of the stud 17 is a reduced diameter passage and the final orifice or perforation 19 of the jet 18 is materially smaller than the intermediate passage thus providing a pressure chamber.

The operation, uses and advantages of the invention just described are as follows:

Assuming that the trough has been partially filled with bubble producing liquid 21 to a depth that will assure that the aperture 3 is completely immersed therein when the disc is rotated, the disc is then placed within the trough with the axle 11 positioned in the medial depressions of the side walls 5 and 6. One end of said axle carries a hand wheel 22 whereby the axle may be rotated to produce rotation of the disc. The elongated tube 20 is positioned on the tubular stud so as to extend transversely outwardly in the manner shown. The disc is regulated as to position within the trough so that the apertures 3 may be closely adjacent the perforation 19 or spaced therefrom as illustrated in Figures 1 and 4. This is accomplished by moving the axle so that pairs of the flanges 12 to 15 inclusive may embrace the side wall 5 in the zone of the depression 10. Furthermore, as shown in the drawing, the face of the disc which faces the plate 16 has the apertures counter-sunk, as shown at 23, thus making the opening funnel-shaped. The counter-sunk apertures assure that the bubble producing liquid will flow toward the edge of the apertures; in other words, the portion indicated at 24 in Figure 4. The counter-sinking of the apertures is quite important because the configuration tends to bring the film entirely to the portion 24 which is preferably cylindrical, the flaring portion 23 of the countersink directing the film to the smallest portion and this, it will be noted, is on the side of the disk opposite the jet 18—19 which concentrates the air at a point somewhere between the proximate face of the disk and the side wall. The stream of air thus concentrated tends to expand again before it reaches the disk but the flaring portion 23 aids in concentrating the entire stream at the margin 24, thus producing ideal results. Assuming that the disc is spaced from plate 16 as shown in both Figures 1 and 4 the bubble producing liquid will bridge the aperture at the edge and when air is directed through the tube, the air is jetted through the perforation 19 and through an aperture 3. This aperture, due to its spacing from the perforation 19, will produce bubbles of large size. The closer the disc to the perforation 19, the smaller the bubbles produced as the vertex of the cone of the bore is fairly close to the orifice 19 of the jet. It is possible to move the disc so that an aperture is eccentric to the perforation 19 and bubbles will be blown from the edge of said aperture.

It may be noted that the bubble producing liquid actually bridges the apertures with any excess of said liquid flowing back within the trough. The disc assures that there is no beating action of the bubble liquid consequent upon rotation of the disc and therefore, froth is not formed.

By reference to Fig. 4 it will be noted that the space within the tapered tube 20 is much restricted at its forward end by the stud 17 forming a shoulder so this space is a pressure chamber leading to the cylindrical space inside of the stud and then to the jet formed by the tapered bore 18 and the orifice 19, the latter, as best seen in Fig. 2, being much smaller than the diameter of the space 17a and the latter is about the same diameter as the inside of the free end of the tube 20. This makes it easier to give a steady stream of air thru the jet.

I claim:

1. In a bubble blower, a trough having side walls with alined depressions therein, a disk having a plurality of circularly spaced film forming apertures and having an axle resting in the alined depressions and extending beyond the margin of one of the side walls for convenient rotation of the disk, said axle having thereon a series of flanges spaced apart a distance greater than the thickness of the side wall and adapted to position the axle to bring the disk to any one of a plurality of positions parallel to said one of the side walls.

2. In combination, a bubble blowing device of the type in which a disk having a plurality of apertures therein is rotated so that the apertures pass in sequence into and out of a trough containing a bubble producing liquid to form a liquid film closing the apertures in turn and a film closed aperture is moved by rotation of said disk to a position in which a stream of air parallel to but spaced from the axis of rotation of the disk is blown toward the film to dislodge the film and produce a bubble; and means for directing said stream of air, said means comprising a blowing element having at one end an air inlet, and at the other end a restricted air outlet discharging air toward said film and having between the inlet and the outlet a central pressure chamber of materially greater cross section than the outlet, whereby air introduced under pressure at the inlet end of the blowing element passes from the blowing element more steadily than if the central chamber were of the same cross section as the outlet.

3. The device of claim 2 in which the restricted air outlet is a portion of a conical jet, a hollow sleeve coaxial with the jet forms an air passage to the jet, and a tube fits over the hollow sleeve and forms with it the central pressure chamber.

4. The device of claim 3 in which the hollow sleeve is a stud integral with the wall of the trough, the jet is a frusto-conical opening in said wall with its smallest diameter at the side of the wall opposite the stud, and the tube is tapered, the larger end of the tube fitting over the stud and the smaller end being for insertion in the user's mouth.

5. A bubble producing device comprising an elongated trough having two flat parallel sides and adapted to hold a bubble producing liquid, a depression formed in each of the flat sides, a disk provided with a shaft adapted to lie in the two depressions so as to support the disk partly immersed in the bubble producing liquid in the trough, said disk having a plurality of spaced film producing apertures, and a transversely extending blowing element secured to one of said flat sides and extending parallel to the shaft or axle of the disk, said blowing element having a series of coaxial openings therein comprising in order an initial passage, a reduced diameter passage, said reduced diameter passage being the intermediate passage, and a conical jet leading from the intermediate passage to a final orifice, the diameter of the intermediate passage being materially greater than the diameter of the final orifice, said jet concentrating the stream of air at a point between the final orifice and the proximate face of the disk.

6. A disk with a central axle and having a circular series of circular apertures, the disk being adapted for partial immersion in a pool of bubble producing liquid to form films of liquid across the apertures as the disk is rotated in the pool with the apertures passing in turn beneath the liquid level, each of the apertures extending completely through the disk and being countersunk so as to be bounded by a funnel-shaped surface of revolution with its greatest diameter at one face of the disk and its least diameter at the opposite face of the disk, whereby to assure that the bubble producing liquid will flow toward the edge of the aperture which has the least diameter.

References Cited in the file of this patent

UNITED STATES PATENTS

| | | |
|---|---|---|
| 2,137,034 | Sturm | Nov. 15, 1938 |
| 2,393,039 | Gilchrist | Jan. 15, 1946 |
| 2,412,732 | Holman | Dec. 17, 1946 |
| 2,452,794 | Saachy | Nov. 2, 1948 |
| 2,561,974 | Corbitt | July 24, 1951 |
| 2,628,449 | Raizen | Feb. 17, 1953 |